US010912089B2

(12) United States Patent
Nader et al.

(10) Patent No.: US 10,912,089 B2
(45) Date of Patent: Feb. 2, 2021

(54) DYNAMICALLY CONFIGURING NB-IOT CARRIERS (71) Applicant: Telefonaktiebolaget LM Ericsson (publ), Stockholm (SE)

(72) Inventors: Ali Nader, Malmö (SE); Andreas Höglund, Solna (SE); Yuhang Liu, Lund (SE); Béla Rathonyi, Lomma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/088,997

(22) PCT Filed: Mar. 29, 2017

(86) PCT No.: PCT/EP2017/057476
§ 371 (c)(1),
(2) Date: Sep. 27, 2018

(87) PCT Pub. No.: WO2017/167839
PCT Pub. Date: Oct. 5, 2017

(65) Prior Publication Data
US 2019/0150151 A1 May 16, 2019

Related U.S. Application Data (60) Provisional application No. 62/316,749, filed on Apr. 1, 2016.

(51) Int. Cl.
*H04W 72/04* (2009.01)
*H04L 5/00* (2006.01)
(Continued)

(52) U.S. Cl.
CPC ......... *H04W 72/0453* (2013.01); *H04L 5/001* (2013.01); *H04W 4/70* (2018.02); *H04W 56/001* (2013.01)

(58) Field of Classification Search
CPC . H04W 72/0453; H04W 4/70; H04W 56/001; H04L 5/001
See application file for complete search history.

(56) References Cited

U.S. PATENT DOCUMENTS 9,992,714 B1 * 6/2018 Singh ................ H04W 36/0066
2008/0267127 A1 10/2008 Narasimha et al.
(Continued)

FOREIGN PATENT DOCUMENTS

EP 2930990 A1 10/2015

OTHER PUBLICATIONS

NTT DOCOMO, "Remaining issues on multiple NB-IoT carrier operations", 3GPP TSG RAN WG1 NB-IoT Ad-Hoc Meeting, Feb. 15-19, 2016, pp. 1-3, R1-161020, St. Julian's, Malta.
(Continued)

*Primary Examiner* — Edan Orgad
*Assistant Examiner* — Malick A Sohrab
(74) *Attorney, Agent, or Firm* — Sage Patent Group (57) ABSTRACT The present invention pertains to a network entity, wireless radio device, a method of controlling a network entity and a method of controlling a wireless radio device. The network entity is operative to control a first carrier arranged to serve at least a first group of wireless radio devices and a second carrier arranged to serve at least a second group of wireless radio devices. The first carrier is further arranged, when a wireless radio device belonging to a first group of wireless radio devices connects to the first carrier, to transfer the wireless radio device to the second carrier, and the network entity is arranged, when the wireless radio device is transferred, to indicate to the wireless radio device that the second carrier is configured to serve as a carrier for other wireless radio devices.

14 Claims, 8 Drawing Sheets (51) Int. Cl.
  *H04W 4/70* (2018.01)
  *H04W 56/00* (2009.01)

(56) References Cited

U.S. PATENT DOCUMENTS

| | | | | |
|---|---|---|---|---|
| 2015/0271816 A1* | 9/2015 | Akkarakaran | ...... | H04W 52/146 370/336 |
| 2017/0048791 A1* | 2/2017 | Choi | ................. | H04W 36/0022 |
| 2018/0287846 A1* | 10/2018 | Kim | ................. | H04W 74/0808 |

OTHER PUBLICATIONS

Ericsson, "NB-IoT—Support for operation with Multiple PRBs", 3GPP TSG-RAN1#84, Feb. 15-19, 2016, pp. 1-3, R1-160265, St. Julian's, Malta.

Sony, "Considerations on NB-PDSCH", 3GPP TSG RAN WG1 NB-IoT Ad-Hoc Meeting, Jan. 18-20, 2016, pp. 1-8, R1-160176, Budapest, Hungary.

Intel Corporation, "Remaining details of NB-IoT multi-carrier operation", 3GPP TSG RAN WG1 NB-IIT Ad-Hoc Meeting, Mar. 22-24, 2016, pp. 1-4, R1-161893, Sophia Antipolis, France.

Lenovo, "Discussion on NB-IoT multi-carrier operation", 3GPP TSG RAN WG1 Meeting #84, Feb. 15-19, 2016, pp. 1-4, R1-161008, St. Julian's, Malta.

NTT DOCOMO, Inc. et al., "Way forward on RAN2 aspects of multiple PRB operations", TSG-RAN WG2 meeting #93, Feb. 15-19, 2016, pp. 1-5, R2-161888, St. Julian's, Malta.

Huawei, "On channel arrangement for NB-IOT", 3GPP RAN WG4 Meeting #77, Nov. 16-20, 2015, pp. 1-4, R4-157639, Anaheim, US.

Ericsson, "NB-IoT—Remaining issues for NPBCH and MIB", 3GPP TSG RAN WG1 NB-IoT Ad-Hoc Meeting, Mar. 22-24, 2016, pp. 1-6, R1-161820, Sophia Antipolis, France.

* cited by examiner

| LTE system bandwidth | 3MHz | 5MHz | 10MHz | 15MHz | 20MHz |
|---|---|---|---|---|---|
| PRB indices for NB PSS/SSS transmission | 2, 12 | 2, 7, 17, 22 | 4, 9, 14, 19, 30, 35, 40, 45 | 2, 7, 12, 17, 22, 27, 32, 42, 47, 52, 57, 62, 67, 72 | 4, 9, 14, 19, 24, 29, 34, 39, 44, 55, 60, 65, 70, 75, 80, 85, 90, 95 |

DYNAMICALLY CONFIGURING NB-IOT CARRIERS

TECHNICAL FIELD

The present invention relates generally to networks and more specifically to a network entity, wireless radio device, a method of controlling a network entity and a method of controlling a wireless radio device.

BACKGROUND

NB-IoT is a narrowband system being developed for cellular Internet of Things by 3GPP. The system is based on existing LTE systems and addresses optimized network architecture and improved indoor coverage for a large number of devices. The system is expected to have the following characteristics:
- low throughput devices (e.g. 2 kbps)
- low delay sensitivity (~10 seconds)
- ultra-low device cost (below 5 dollars)
- low device power consumption (battery life of 10 years)

It is envisioned that each cell (covering an area of approximately 1 km$^2$) in this system will serve thousands of devices (~50 thousand) such as sensors, meters, actuators, and the like. In order to be able to make use of existing spectrum, e.g. GSM, a fairly narrow bandwidth has been adopted for NB-IoT technology. It is envisaged that a bandwidth of 180 kHz would be used, which is the bandwidth of one LTE Physical Resource Block (PRB).

For FDD mode of NB-IoT (i.e. the transmitter and the receiver operate at different carrier frequencies) only half-duplex mode needs to be supported in the wireless radio device. In order to achieve improved coverage, data repetition is used both in UL and/or DL. The lower complexity of the devices (e.g. only one transmission/receiver chain) means that some repetition might be needed also in normal coverage.

Furthermore, to alleviate wireless radio device complexity, the working assumption is to have cross-subframe scheduling. That is, a transmission is first scheduled on a Physical DL Control Channel (NPDCCH) and then the first transmission of the actual data on the Physical DL Shared Channel (NPDSCH) is carried out after the final transmission of the NPDCCH.

Similarly for uplink (UL) data transmission, information about resources scheduled by the NW and needed by the wireless radio device for UL transmission is first conveyed on the NPDCCH and then the first transmission of the actual data by the wireless radio device on the Physical UL Shared Channel (NPUSCH) is carried out after the final transmission of the NPDCCH.

Therefore, for both cases above, there is no simultaneous reception of control channel and reception/transmission of data channel from the wireless radio device's perspective.

Figure 1:
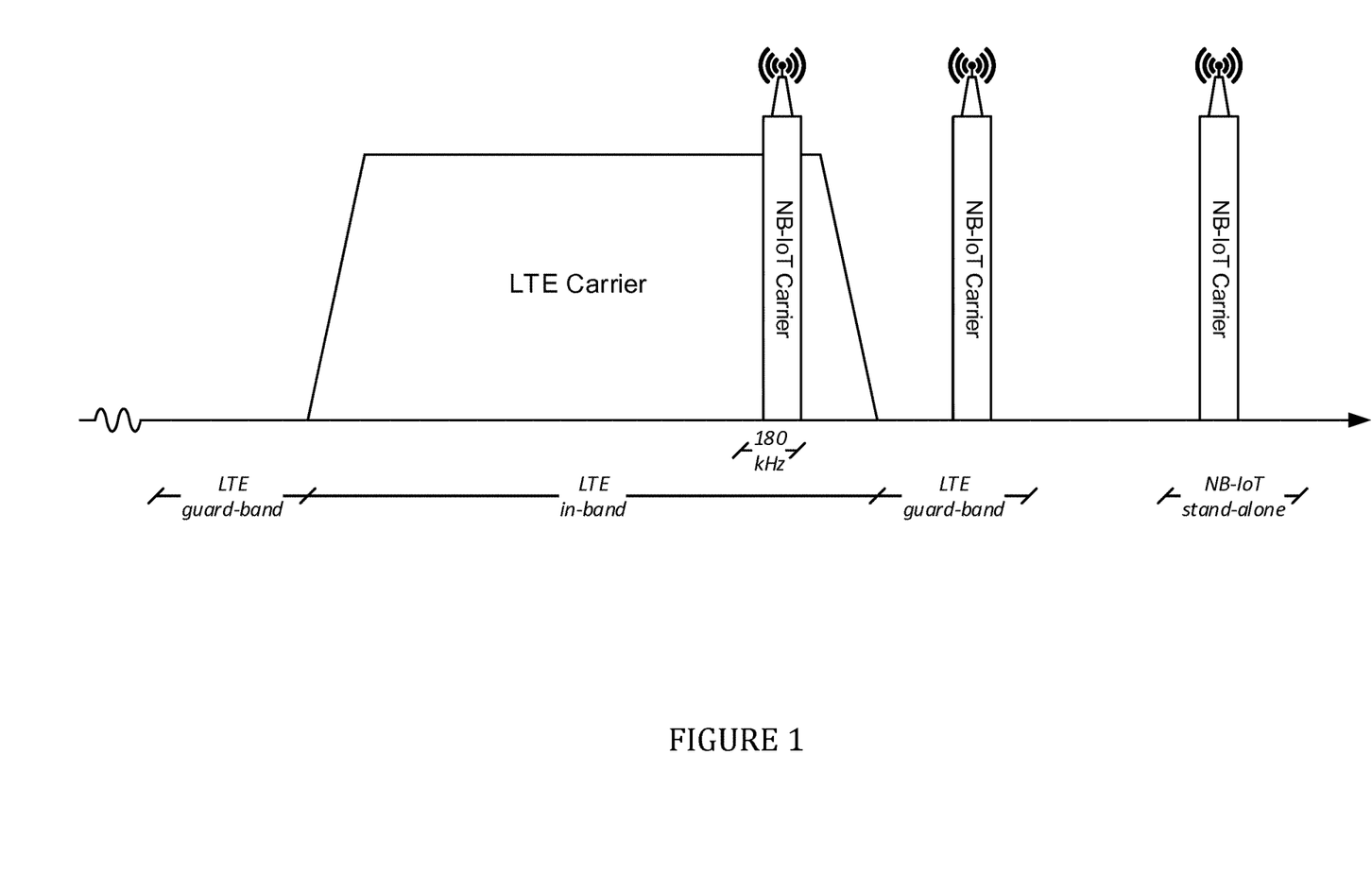
FIG. 1 shows the three operation modes of an NB-IoT carrier: stand-alone, LTE guard-band and LTE in-band.

Furthermore, not all the subframes are available for dedicated data communication in DL in an NB-IoT carrier. The amount of available subframes in the DL is dependent on one of the three operation modes (namely, Stand-alone, In-band, and Guard-band) NB-IoT is deployed in, as depicted in FIG. 1. For all operation modes, a wireless radio device needs to rate-match around the following non-available subframes (or parts of subframe):
  The NB-IoT primary and secondary synchronization channels (NPSS and NSSS), where NPSS is transmitted every 5th subframe (NSSS transmission cycle is still to be defined in 3GPP)
  The NB-IoT broadcast channel (NPBCH) containing the Master Information Block (MIB) occupying every 0th subframe.
  The NB-IoT system information blocks broadcast on NDLSCH (e.g. NSIB1 broadcast in 4th subframe of every other 10 ms frame)
  DL gaps, when configured (however, this is yet to be defined in 3GPP)
  NB-IoT reference symbols (NRS)
  And, in addition, in the case of in-band operation:
  LTE reference symbols such as CRS and positioning reference symbols, and LTE MBSFN subframes.

Figure 2A:
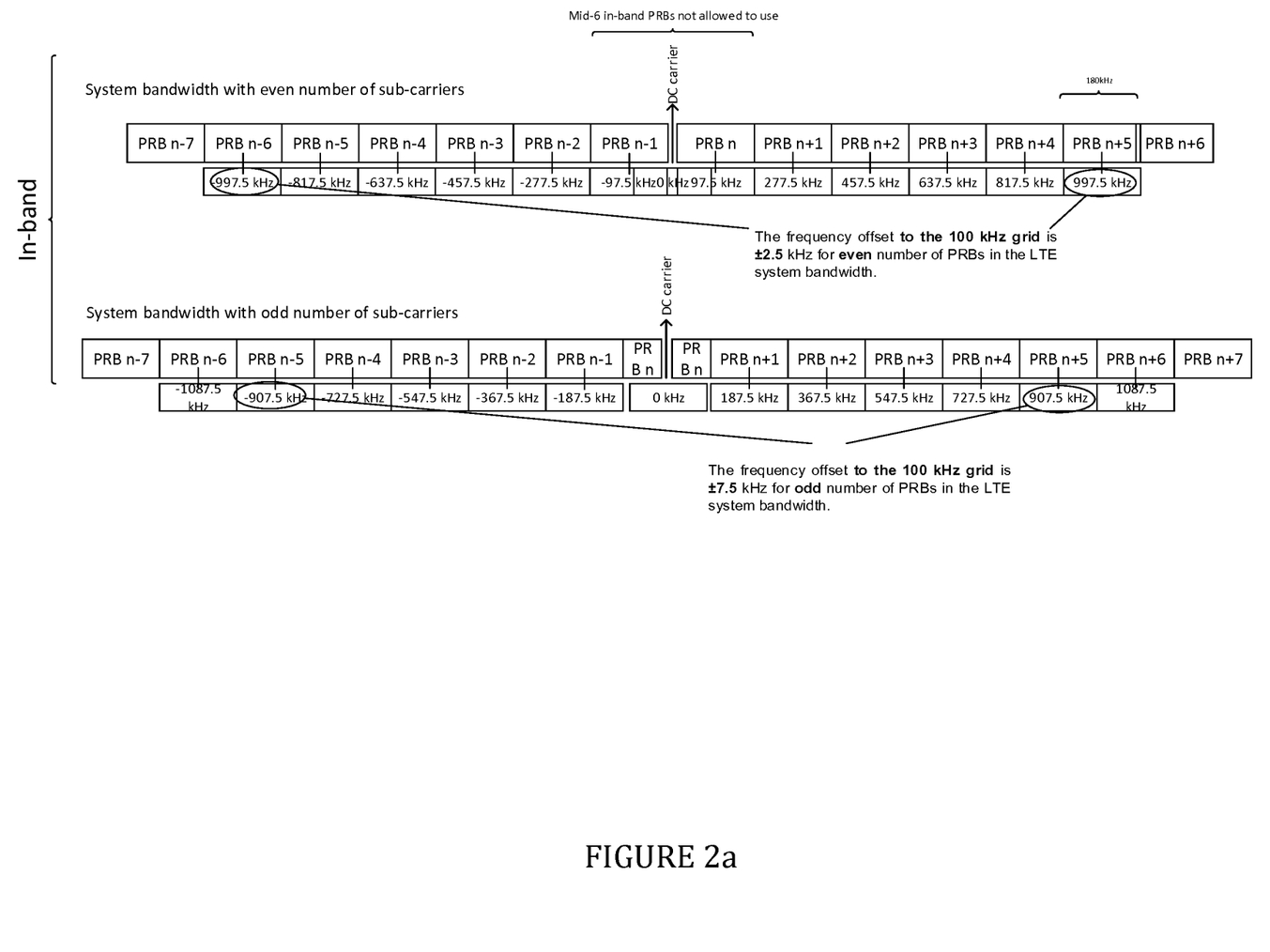
FIG. 2a shows possible NB-IoT carriers for a carrier deployment in LTE in-band mode.
Figure 2B:
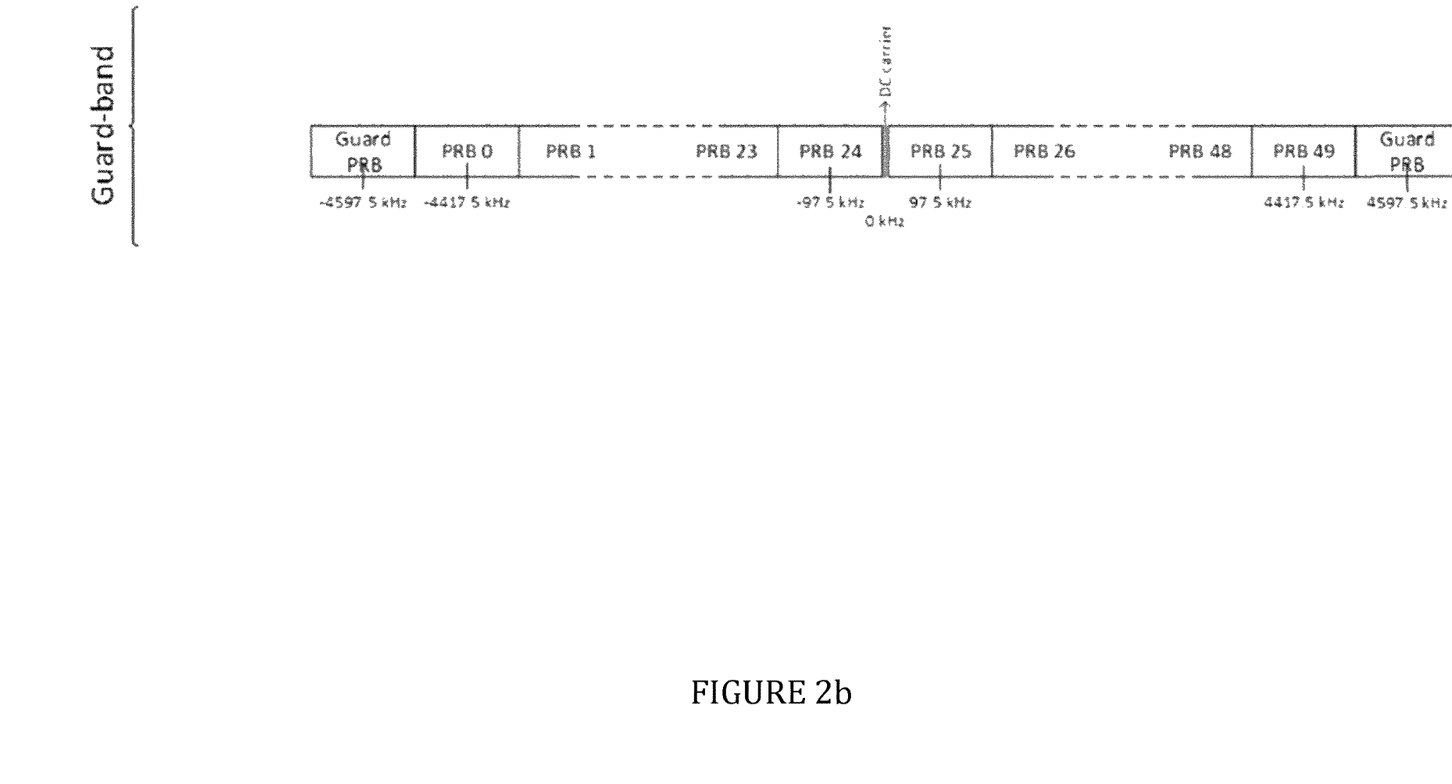
FIG. 2b shows possible NB-IoT carriers for a carrier deployment in LTE guard mode.
Figure 2C:
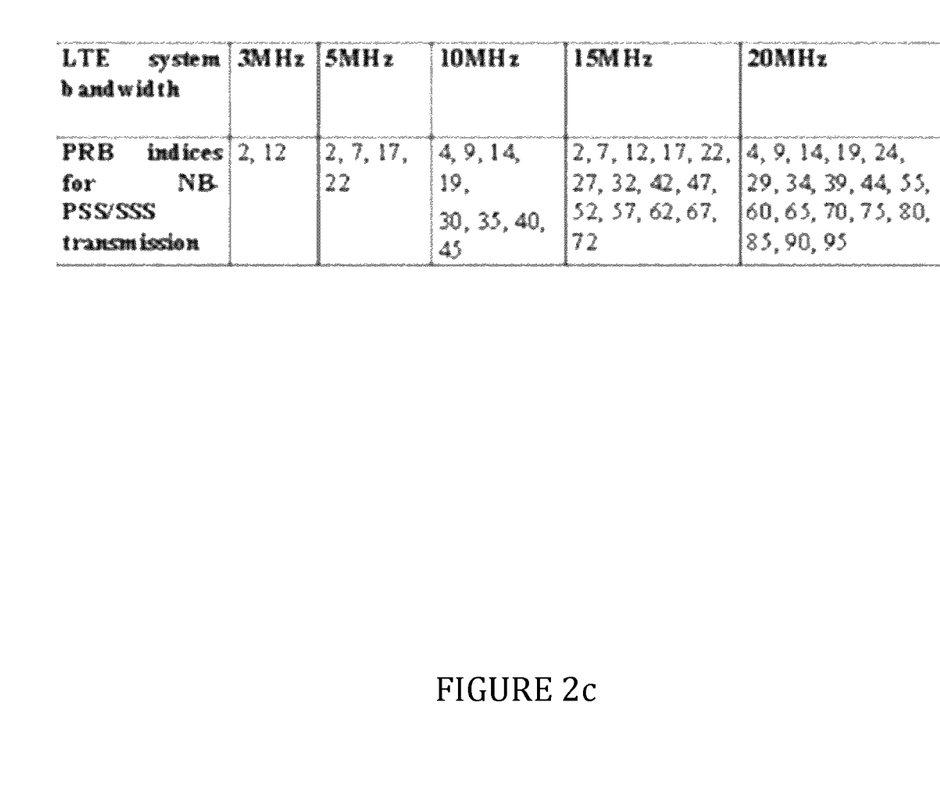
FIG. 2c shows agreed LTE in-band PRBs possible for a carrier deployment.

Further 3GPP requirements are also specified, such as that a NB-IoT carrier may only be deployed on a 100 kHz frequency raster (±7.5 kHz). In the in-band case, not to overlap with the middle 6 LTE PRBs (because too few subframes are available due to broadcast of LTE synchronization signals and broadcast of LTE MIB), and in the in-band/guard-band operation modes not all LTE PRBs are possible to configure as NB-IoT carriers, as depicted in FIGS. 2a, 2b and 2c.

Due to the nature of NB-IoT with half-duplex communication, cross-scheduling, low bandwidth, the available amount of subframes, the 100 kHz raster requirement for carriers (known as an NB-IoT Anchor carrier in 3GPP) deployment, and the amount of wireless radio devices to be served, it becomes evident that (as with all other communication devices) NB-IoT will benefit from utilizing more spectrum for efficient operation, especially if such spectrum is already available (e.g. in an in-band operation mode during low traffic hours when LTE carrier is not fully used).

Figure 3:
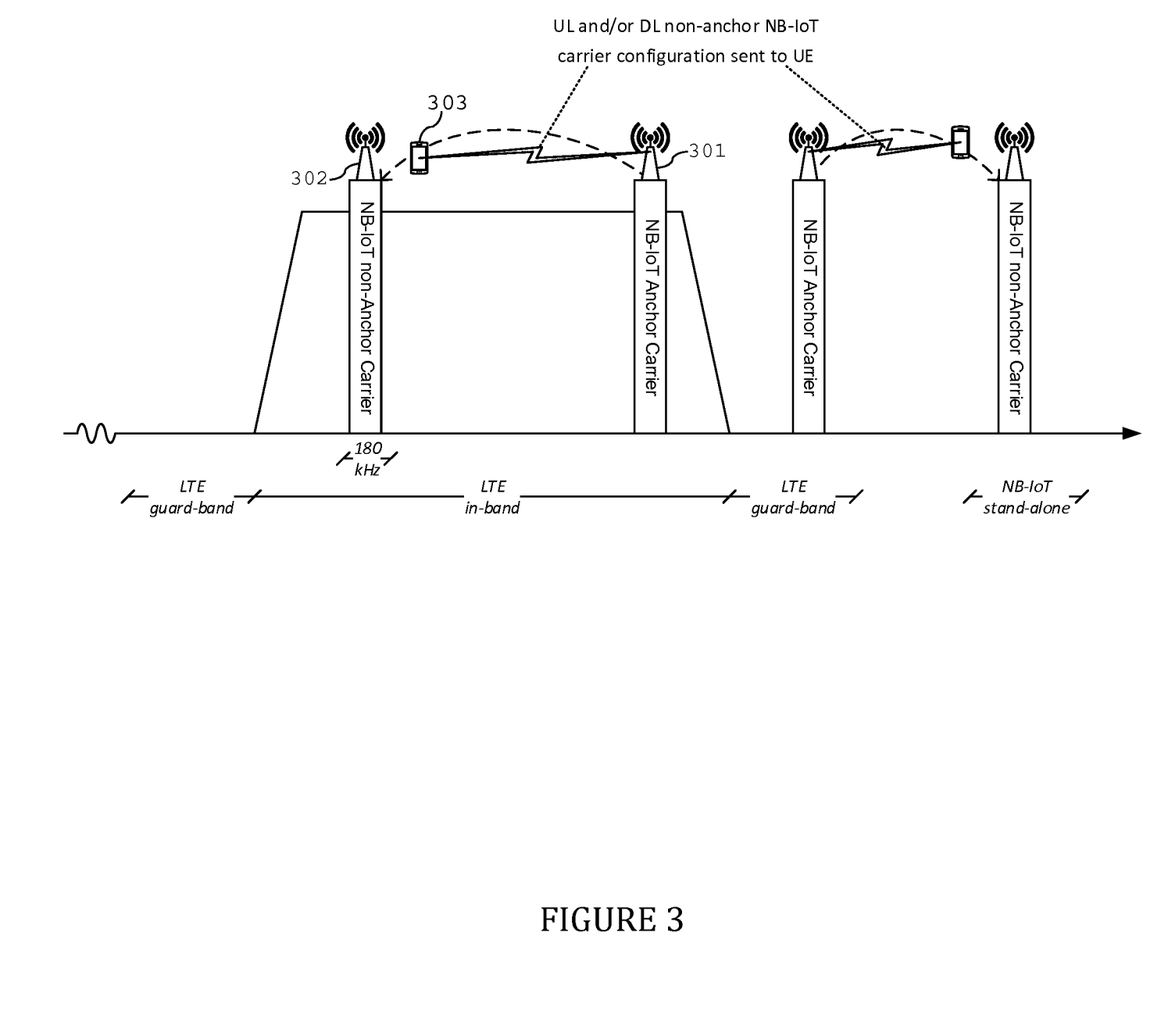
FIG. 3 shows exemplary scenarios where a wireless radio device is transferred from a carrier (known as an NB-IoT anchor carrier in 3GPP) to a non-anchor carrier.

FIG. 3 depicts a currently envisaged operation of NB-IoT networks. NB-IoT multi-carrier operation has been adopted where the wireless radio device 303 operating in a carrier 301 is configured through higher layer signaling (Layer 3 RRC) to operate in an NB-IoT non-anchor carrier 302 (which does not have the requirement to be deployed on the 100 kHz raster, i.e. any LTE in-band PRB can be used) during connected mode operation. At the end of connected mode operation, the wireless radio device 303 autonomously returns back to the carrier 301.

Therefore, existing solutions/agreements in 3GPP are built around the idea that a NB-IoT non-anchor carrier is not a carrier, i.e. synchronization signals (NSS/PSS) and system information are not provided in such a carrier. At present, even if the NB-IoT non-anchor carrier would be fully operational, the wireless radio device need not receive nor perform rate-matching around NSS/PSS, and PBCH.

As a result of the wireless radio device not rate-matching around non-available subframes a number of drawbacks will result, namely:
  NW resource scheduling becomes very complex since the NW needs to constantly make sure that no collision takes place between dedicated/unicast data aimed for the wireless radio device and non-available subframes (or parts of subframe) in the carrier.
  Even if the NW succeeds in such scheduling, there will be need for much more control information (NPDCCH) for avoiding overlap with unavailable subframes than it would be necessary leading to waste of wireless radio device battery power.
  NW may not be able to reconfigure wireless radio devices in less than optimal coverage to such NB-IoT non-anchor carrier since other wireless radio devices are in need of many repetitions which imply overlapping the non-available subframes.

In case the NW just lets the wireless radio device receive data in the non-available subframes rather than complex scheduling, there would be waste of wireless radio device power and also a risk for false data detection.

The present invention aims to provide an apparatus and method for a network entity and an apparatus and method for a wireless radio device which exhibits improved NW resource scheduling, performs rate-matching, uses less device power consumption and provides better synchronization.

SUMMARY

The present invention provides a network entity operative to control a first carrier arranged to serve at least a first group of wireless radio devices and a second carrier arranged to serve at least a second group of wireless radio devices. The first carrier is further arranged, when a wireless radio device belonging to a first group of wireless radio devices connects to the first carrier, to transfer the wireless radio device to the second carrier. The network entity is arranged, when the wireless radio device is transferred, to indicate to the wireless radio device that the second carrier is configured to serve as a carrier for other wireless radio devices.

The present invention also provides a wireless radio device belonging to a first group of wireless radio devices. The wireless radio device is arranged to connect to a first carrier arranged to serve at least the first group of wireless radio devices and arranged to transfer the connected wireless radio device to a second carrier arranged to serve at least the second group of wireless radio devices and receive an indication that the second carrier is configured to serve as a carrier for other wireless radio devices.

The present invention also provides a method of controlling a network entity. The method comprises transferring a connected wireless radio device belonging to a first group of wireless radio devices from a first carrier arranged to serve at least a first group of wireless radio devices to a second carrier arranged to serve at least a second group of wireless radio devices and indicating to the transferred wireless radio device that the second carrier is configured to serve as a carrier for other wireless radio devices.

The present invention also provides a method of controlling a wireless radio device belonging to a first group of wireless radio devices. The method comprises connecting to a first carrier arranged to serve at least the first group of wireless radio devices and arranged to transfer the connected wireless radio device to a second carrier arranged to serve at least a second group of wireless radio devices and receiving an indication that a second carrier is configured to serve as a carrier for other wireless radio devices.

BRIEF DESCRIPTION OF THE DRAWINGS

Embodiments of the invention will now be described by way of example only with reference to the accompanying drawings, in which like reference numbers designate the same or corresponding parts, and in which.

DETAILED DESCRIPTION OF EMBODIMENTS

First Embodiment

Figure 4:
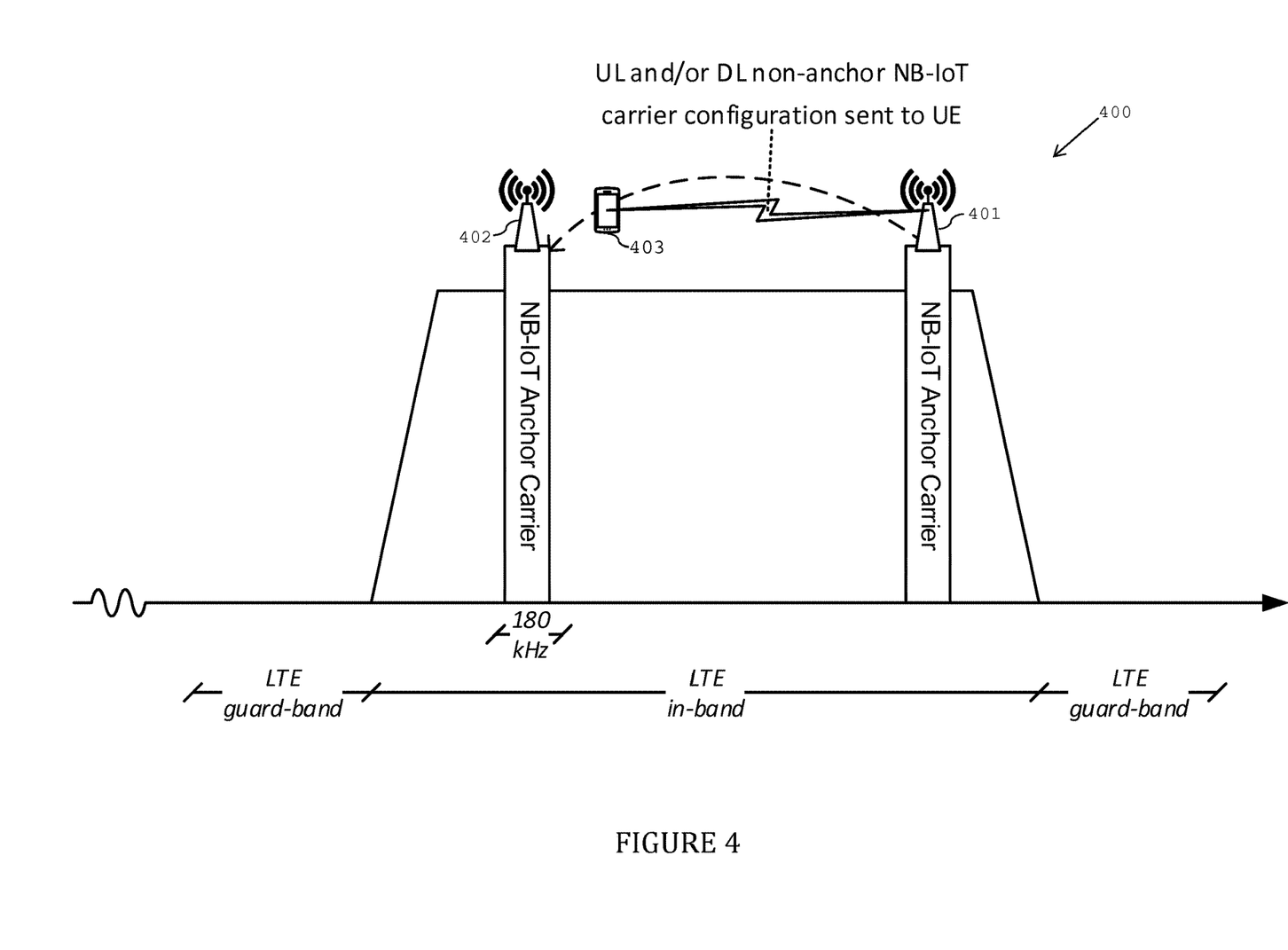
FIG. 4 shows a scenario where a wireless radio device is transferred from a first carrier (known as an NB-IoT anchor carrier in 3GPP) to a second carrier, according to a first embodiment of the present invention.

A first embodiment of the present invention will be described with reference to FIG. 4, which schematically shows a network entity 400 and a wireless radio device 403.

In one example, the network entity 400 is a NB-IoT network entity 400 but other network entities are envisaged.

The network entity 400 is operable to control a first carrier 401 and a second carrier 402.

A carrier in NB-IoT 3GPP is known as an NB-IoT Anchor Carrier. To simplify the understanding, it is known as a "carrier" throughout the present description. A carrier can have many functions. For example, the carrier may be a carrier that is on the raster that a wireless radio device will initially search for and provide all necessary information such as synchronization signals, reference signals, paging information and broadcast information and can be used for dedicated communication. In one specific non-limiting example the carrier may provide synchronization signals and system information to at least the wireless radio devices it is configured serve.

In the first embodiment more than one carrier is configured in a particular area, so as to be able to serve a large number of wireless radio devices in Idle mode e.g. for distributing paging load or NW access among thousands of wireless radio devices and therefore it should be possible to configure wireless radio devices among such carriers based on load situation in connected mode. Therefore, two carriers are provided in one coverage area.

In this way, a large number of wireless radio devices can be spread across many carriers.

Therefore, the first carrier 401 is arranged to serve at least a first group of wireless radio devices and the second carrier 402 is arranged to serve at least a second group of wireless radio devices.

In one non-limiting example, the first carrier may be arranged to provide synchronization signals and system information to at least the first group of wireless radio devices and the second carrier may be arranged to provide synchronization signals and system information to at least the second group of wireless radio devices.

In this non-limiting example, the first group of wireless radio devices is different from the second group of wireless radio devices, with each group comprising wireless radio devices that are different from the wireless radio devices in any other group. The groups are provided so that each carrier serves only a part of the total devices which the network entity as a whole serves. In this way a large number of wireless radio devices can be served with the paging load and NW access being shared amongst the carriers.

As explained previously each carrier may operate in one of three modes, as depicted in FIG. 1. Namely, they may operate in an LTE in-band mode, an LTE guard-band mode or an NB-IoT stand-alone mode. Each carrier may operate in any of the three modes without limitation. In FIG. 4 the first and second carriers 401, 402 are shown operating in the LTE in-band mode. However, other examples are possible. For example, the first carrier 401 may operate in in-band mode whilst the second carrier 402 may operate in LTE guard-band mode. Alternatively, the first carrier 401 may operate in NB-IoT stand-alone mode whilst the second carrier 402 may operate in LTE guard-band mode.

In the first embodiment, the wireless radio device 403 belongs to the first group of wireless radio devices and is arranged to connect to the first carrier 401.

When the wireless radio device 403 connects to the first carrier 401, the first carrier 401 is arranged to transfer the wireless radio device 403 to the second carrier 402. One way to achieve this is by configuring the wireless radio device 403 to the second carrier 402 which serves as a carrier for other wireless radio devices. For example, the second carrier 402 may be configured to serve as a carrier for at least the second group of wireless radio devices.

Once the transfer occurs, the network entity 400 is arranged to indicate to the wireless radio device 403 that the second carrier 402 is configured to serve as a carrier for other wireless radio devices (e.g. the second group of wireless radio devices). Therefore, the wireless radio device 403 is arranged to receive an indication that the second carrier 402 is configured to serve as a carrier for other wireless radio devices.

In a non-limiting example, the network entity 400 may be further arranged to provide, to the wireless radio device 403, synchronization signals and system information. The wireless radio device 403, having received synchronization signals and system information and the indication that the second carrier 402 is configured to serve as a carrier for other wireless radio devices, knows which subframes (or parts thereof) are available for unicast transmission.

In the first embodiment, by way of non-limiting example, the same subframes are available in both the first carrier 401 and the second carrier 402, for simplicity.

In another non-limiting example, the network entity 400 may be further arranged to indicate to the wireless radio device that rate-matching is allowed around non-available subframes.

In a further non-limiting example, the wireless radio device 403 may be arranged to perform rate-matching around non-available subframes. In this manner, the wireless radio device 403 can avoid unavailable subframes without constant interaction from the network.

Additionally, in a further non-limiting example, the wireless radio device 403 may optionally perform further functions. In particular, the wireless radio device 403 may turn off its receiver/transmitter chain during non-available subframes.

Alternatively or in addition the wireless radio device 403 may optionally utilize the target carrier NPSS/NSSS. In this way, the wireless radio device 403 may utilize the synchronization signals, provided by the second carrier 402, for better synchronization.

Figure 5:
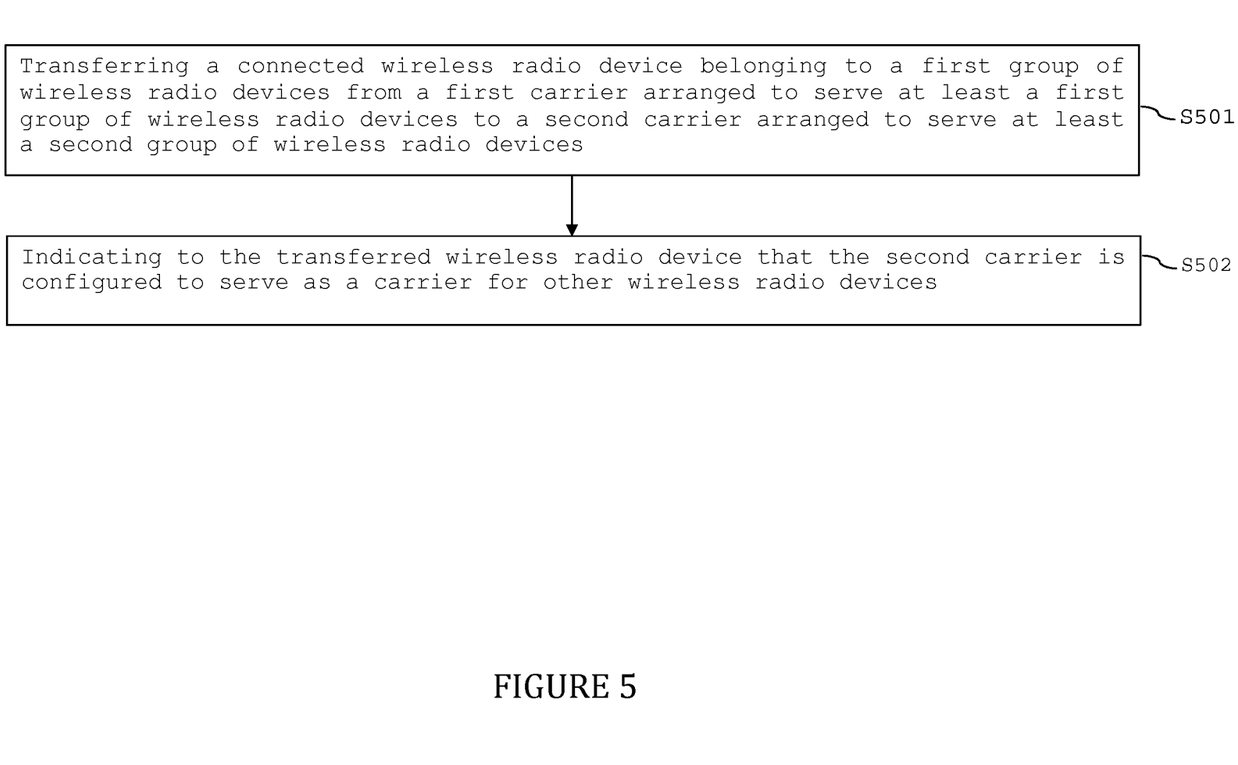
FIG. 5 shows a method of operating a network entity according to a first embodiment of the present invention.

FIG. 5 shows a method for controlling a network entity according to the first embodiment.

Referring to FIG. 5, at step S501, a connected wireless radio device belonging to a first group of wireless radio devices is transferred from a first carrier to a second carrier arranged to serve at least a second group of wireless radio devices. One way to achieve this is by configuring the wireless radio device to the second carrier which serves as a carrier for other wireless radio devices. For example, the second carrier may be configured to serve as a carrier for at least the second group of wireless radio devices.

At step S502, an indication is made to the transferred wireless radio device that the second carrier is configured to serve as a carrier for other wireless radio devices (e.g. the second group of wireless radio devices).

In a non-limiting example, the method may further comprise providing, to the wireless radio device, synchronization signals and system information.

In another non-limiting example, the method may further comprise indicating to the wireless radio device that rate-matching is allowed around non-available subframes.

Figure 6:
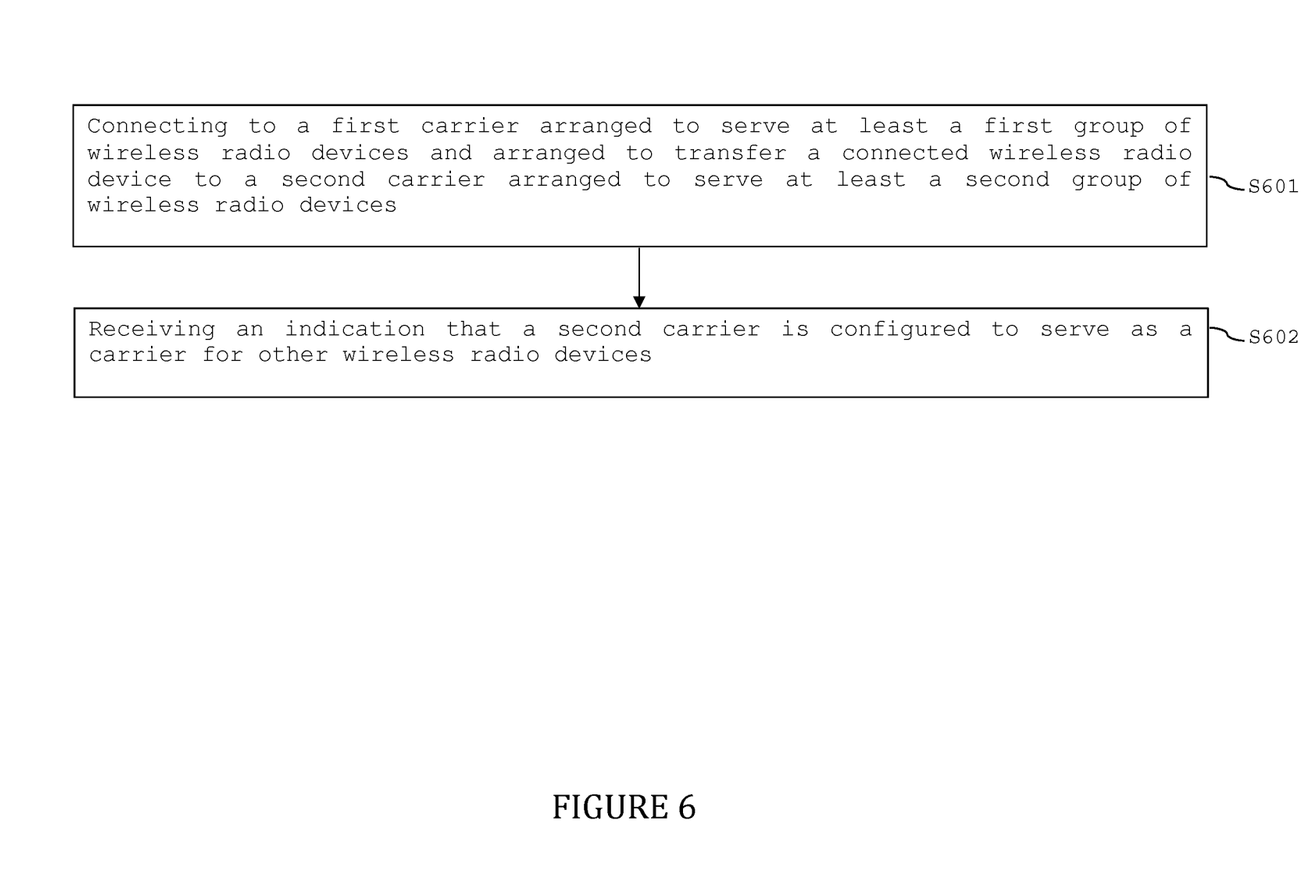
FIG. 6 shows a method of operating a wireless radio device according to a first embodiment of the present invention.

FIG. 6 shows a method for controlling a wireless radio device belonging to first group of wireless radio devices.

Referring to FIG. 6, at step S601, the wireless radio device is connected to a first carrier arranged to serve at least the first group of wireless radio devices. The first carrier is further arranged to transfer the wireless radio device to a second carrier arranged to serve at least a second group of wireless radio devices.

At step S602, the wireless radio device receives an indication that the second carrier is configured to serve as a carrier for other wireless radio devices (e.g. the second group of wireless radio devices).

In a non-limiting example, the method may further comprise receiving synchronization signals and system information. The wireless radio device, having received synchronization signals and system information and the indication that the second carrier is configured to serve as a carrier for other wireless radio devices, knows which subframes (or parts thereof) are available for unicast transmission.

In a further non-limiting example, the method may further comprise performing rate-matching around non-available subframes. In this manner, the wireless radio device 403 can avoid unavailable subframes without constant interaction from the network.

Additionally, in a further non-limiting example, the method may optionally provide further steps. In particular, the method may further comprise, the wireless radio device turning off its receiver/transmitter chain during non-available subframes.

Alternatively or in addition the method may further comprise the wireless radio device utilizing the target carrier NPSS/NSSS. In this way, the wireless radio device may utilize the synchronization signals for better synchronization.

The first embodiment also encompasses a first computer program. The first computer program may be provided on a computer-readable medium.

When the first computer program is run on a network entity, the program performs the function of the network entity which is operable to control a first carrier and a second carrier.

The first carrier is arranged to serve at least a first group of wireless radio devices and the second carrier is arranged to serve at least a second group of wireless radio devices.

In one non-limiting example, the first carrier may be arranged to provide synchronization signals and system information to at least the first group of wireless radio devices and the second carrier may be arranged to provide synchronization signals and system information to at least the second group of wireless radio devices.

The present embodiment also encompasses a second computer program. The second computer program may be provided on a computer-readable medium.

The second computer program, when run on a wireless radio device, performs the function of the wireless radio device which belongs to the first group of wireless radio devices and is arranged to connect to the first carrier.

When the wireless radio device connects to the first carrier, the first carrier is arranged to transfer the wireless radio device to the second carrier. One way to achieve this is by configuring the wireless radio device to the second carrier which serves as a carrier for other wireless radio devices. For example, the second carrier 402 may be configured to serve as a carrier for at least the second group of wireless radio devices.

Once the transfer occurs, the network entity is arranged to indicate to the wireless radio device that the second carrier is configured to serve as a carrier for other wireless radio devices (e.g. the second group of wireless radio devices). Therefore, the wireless radio device 403 is arranged to receive an indication that the second carrier 402 is configured to serve as a carrier for other wireless radio devices.

In a non-limiting example, the network entity may be further arranged to provide, to the wireless radio device, synchronization signals and system information. The wireless radio device, having received synchronization signals and system information and the indication that the second carrier is configured to serve as a carrier for other wireless radio devices, knows which subframes (or parts thereof) are available for unicast transmission.

In the first embodiment, by way of non-limiting example, the same subframes are available in both the first carrier and the second carrier, for simplicity.

In another non-limiting example, the network entity may be further arranged to indicate to the wireless radio device that rate-matching is allowed around non-available subframes.

In a further non-limiting example, the wireless radio device may be arranged to perform rate-matching around non-available subframes. In this manner, the wireless radio device can avoid unavailable subframes without constant interaction from the network.

Additionally, in a further non-limiting example, the wireless radio device may optionally perform further functions. In particular, the wireless radio device may turn off its receiver/transmitter chain during non-available subframes.

Alternatively or in addition the wireless radio device may optionally utilize the target carrier NPSS/NSSS. In this way, the wireless radio device may utilize the synchronization signals, provided by the second carrier 402, for better synchronization.

The first embodiment also provides modules for performing the function of the network entity.

In particular, the present embodiment provides a module for transferring a connected wireless radio device belonging to a first group of wireless radio devices from a first carrier to a second carrier arranged to serve at least a second group of wireless radio devices. One way to achieve this is by configuring the wireless radio device to the second carrier which serves as a carrier for other wireless radio devices.

For example, the second carrier may be configured to serve as a carrier for at least the second group of wireless radio devices.

The present embodiment also provides a module for indicating to the transferred wireless radio device that the second carrier is configured to serve as a carrier for other wireless radio devices (e.g. the second group of wireless radio devices).

In a non-limiting example, there may also comprise a module for providing, to the wireless radio device, synchronization signals and system information.

In another non-limiting example, there may also comprise a module for indicating to the wireless radio device that rate-matching is allowed around non-available subframes.

The wireless radio device may also be provided by modules.

In particular, the present embodiment provides a module for connecting the wireless radio device to a first carrier arranged to serve at least the first group of wireless radio devices. The first carrier is further arranged to transfer the wireless radio device to a second carrier arranged to serve at least a second group of wireless radio devices.

The present embodiment also provides a module for receiving an indication that the second carrier is configured to serve as a carrier for other wireless radio devices (e.g. the second group of wireless radio devices).

In a non-limiting example, the present embodiment may further comprise a module for receiving synchronization signals and system information. The wireless radio device, having received synchronization signals and system information and the indication that the second carrier is configured to serve as a carrier for other wireless radio devices, knows which subframes (or parts thereof) are available for unicast transmission.

In a further non-limiting example, the present embodiment may further comprise a module for performing rate-matching around non-available subframes. In this manner, the wireless radio device 403 can avoid unavailable subframes without constant interaction from the network.

Additionally, in a further non-limiting example, the present embodiment may further comprise a module for turning off the wireless radio device's receiver/transmitter chain during non-available subframes.

Alternatively or in addition the method may further comprise present embodiment may further comprise a module for utilizing the target carrier NPSS/NSSS. In this way, the wireless radio device may utilize the synchronization signals for better synchronization.

Second Embodiment

The second embodiment of the present invention has the same components as the first embodiment but differs in manner of operation.

More particularly, according to the second embodiment, unlike the first embodiment, the first carrier 401 and the second carrier 402 have different subframe configurations.

The present inventors overcame this by arranging the network entity 400 to convey information indicative of the subframe configuration of the second carrier 402 to the wireless radio device 403.

The network entity 400 may convey the information in a number of ways. The present inventors found that fully conveying the entire subframe configuration of the second carrier 402 to the wireless radio device 403 was particularly effective.

Alternatively, only conveying the changes of the subframe configuration of the second carrier 402 relative to the first carrier 401 was found to minimize the amount of information that needed to be conveyed.

The wireless radio device 403 may therefore be arranged to receive the information indicative of the subframe configuration of the second carrier 402.

The method of controlling a network entity depicted in FIG. 5 also comprises the further step of conveying to the wireless radio device information indicative of the subframe configuration of the second carrier.

Similarly, the method of controlling a wireless radio device in FIG. 6 also comprises the step of receiving the information indicative of the subframe configuration of the second carrier.

The first computer program mentioned in the first embodiment would therefore include the further function of conveying to the wireless radio device information indicative of the subframe configuration of the second carrier.

The second computer program mentioned in the first embodiment would therefore include the further function of receiving the information indicative of the subframe configuration of the second carrier.

The modules provided in the first embodiment for performing the function of the network entity further comprise a module for conveying to the wireless radio device information indicative of the subframe configuration of the second carrier.

The modules provided in the first embodiment for performing the function of the wireless radio device further comprise a module for receiving the information indicative of the subframe configuration of the second carrier.

Third Embodiment

The third embodiment of the present invention pertains to the 3GPP contribution made by the present inventors. In this embodiment the wireless radio device is referred to as user equipment, UE.

In particular, in RAN2 #93 it was agreed as per R2-161888, RAN1 #84 NB-IoT Adhoc, 15-19 Feb. 2016, to add support for multiple PRB operations. In the agreement, it was decided to include configuration of a non-anchor PRB in the IE radioResourceConfigDedicated.

In this embodiment further details about UE reconfiguration to a non-anchor carrier are provided.

36.331 Running CR to capture agreements on NB-IoT specifications related to multi-PRB support the following is captured under 5.3.10.6 Physical channel reconfiguration:

For NB-IoT, the UE shall:
1> if the carrierInfo [FFS] is included and specifies a carrier that the UE shall use for future receptions and transmissions:
2> the UE shall start to use the new carrier immediately after the last transport block carrying the RRC message has been acknowledged by the MAC layer, and any subsequent RRC response message sent for the current RRC procedure is therefore sent on the new carrier;

The details of the configuration of a non-anchor carrier and related actions are FFS
1> reconfigure the physical channel configuration in accordance with the received physicalConfigDedicated-NB.

The contents of physicalConfigDedicated-NB needed for configuring the UE to a non-anchor carrier is further explained below.

In physicalConfigDedicated-NB, a NB-IoT UE is optionally provided with a set of parameters related to the non-anchor carrier(s). The set of parameters are scenario-dependent (e.g. from/to in-band/guard-band/standalone) and relate to downlink and/or uplink non-anchor carriers as presented below in the ASN.1 structure.

```
-- ASN1START
Carrier-ConfigDedicated-NB-r13 ::=         SEQUENCE {
    dl-nonAnchorCarrierFreq-NB-r13         DL-
NonAnchorCarrierFreq-NB-r13         OPTIONAL,
    ul-nonAnchorCarrierFreq-NB-r13         UL-
NonAnchorCarrierFreq-NB-r13         OPTIONAL,
}
-- ASN1STOP
```

Therefore, the following proposal is made:

Proposal 1 Carrier-ConfigDedicated-NB-r13 with the preceding ASN.1 format is introduced in physicalConfigDedicated-NB to specify the UL and/or DL non-anchor carrier(s) structure.

As pointed out in R4-157639, On channel arrangement for NB-IOT, 3GPP RAN WG4 Meeting #77, Anaheim, US, 16-20 Nov. 2015, the actual NB-IoT channel center frequency in the case of in-band/guard-band operations will have a frequency offset to the 100 kHz raster ranging from 2.5 kHz to 47.5 kHz. Hence, in order to be able to configure the UE to a non-anchor carrier, it is proposed to convey the carrier frequency information in terms of eARFCN and an optional offset needed for guard-band/in-band operation as follows in ASN.1 format:

```
-- ASN1START
CarrierFreq-NB-r13 ::=       SEQUENCE {
    carrierFreq-NB-r13           ARFCN-ValueEUTRA-r9,
    carrierFreqOffset-NB-r13 INTEGER (0..19)
    OPTIONAL,   -- Need ON }
-- ASN1STOP
```

The following proposal is also made:

Proposal 2 The non-anchor carrier frequency is configured in terms of eARFCN and an optional offset needed for guard-band/in-band operation according to the preceding ASN.1 format.

As agreed in RAN1 #84, the UE is not expected to receive NPBCH, and NPSS/NSSS and any transmissions other than unicast transmissions in the non-anchor PRB. As a result, the PCI of the non-anchor carriers needs to be communicated to the UEs by either SI broadcast in the anchor carrier or through reconfiguration signaling unless the same PCI is used for the non-anchor carrier as for the anchor carrier. For Rel-13 no benefit is achieved of assigning different PCIs to non-anchor carriers other than the one of the associated anchor carrier.

The following proposal is also made:

Proposal 3 The PCI of a non-anchor NB-IoT carrier is always the same as its associated anchor carrier.

For carrier reconfiguration to a DL non-anchor in-band PRB, apart from the carrier information mentioned above, the number of LTE CRS antenna ports, number of LTE PDCCH symbols (or NB-IoT start symbol), the PRB offset to LTE middle PRB and the knowledge about whether LTE uses same PCI as NB-IoT (in able to be able to use LTE CRS), and number of NRS antenna ports need to be known by the UE prior to the reconfiguration procedure. For carrier reconfiguration to a DL non-anchor PRB, the number of NB-RS antenna ports needs to be known by the UE during the reconfiguration procedure. These configuration parameters can either be broadcasted on the anchor carrier in a newly defined SIB or optionally sent to the UE in dedicated message in case not broadcasted. Further, in the RAN1 #2 Ad-Hoc is was agreed that:

On PRBs different than the NB-IoT carrier on which the UE has received NB-PSS/SSS, NB-PBCH and SIB transmissions, the NB-IoT UE does not rate match around NB-PBCH and NB-PSS/SSS, i.e., the mapping of NB-PDCCH/PDSCH symbols to REs occurs without consideration of NB-PSS/SSS/PBCH.

However, just including an indication that the carrier which the UE is reconfigured to, does in fact contain NPSS/NSSS and NPBCH would allow for reconfiguring and distributing UEs between several anchor carriers. Since the benefits can be rather large for a minor cost such an indication is included here.

The configurations mentioned above are outlined in ASN.1 format below:

```
-- ASN1START
DL-NonAnchorCarrierFreq-NB-r13 ::= SEQUENCE {
    carrierFreq-NB-r13              CarrierFreq-NB-r13,
    nbRsPortsCount-NB-r13           ENUMERATED {n1, n2}
    OPTIONAL, -- Need ON
    servesAsAnchorForOthers         BOOLEAN
    OPTIONAL, -- Need ON
    inbandNonAnchorCarrierInfo
    InbandNonAnchorCarrierInfo      OPTIONAL, -- Cond SIconfig
    ...}
-- ASN1STOP
, where
-- ASN1START
InbandNonAnchorCarrierInfo ::=      SEQUENCE {
    offsetToLteMiddlePrb-NB-r13     INTEGER (-50 .. 49)
       OPTIONAL, -- Cond samePCI
    startSymbol-NB-r13              INTEGER (1 .. 4)
       OPTIONAL,
    sameLtePCI-Indicator-NB-r13     BOOLEAN
       OPTIONAL,
    lteCrsPortsCount-NB-r13         ENUMERATED {an1, an2,
an4, spare1} OPTIONAL,
}
-- ASN1STOP
```

As noted in R1-161820, NB-IoT—Remaining issues for NPBCH and MIB, Ericsson, RAN1 #2 NB-IoT Ad-Hoc Meeting Sophia Antipolis, 22-24Mar. 2016, there is no need to include the bandwidth of the LTE carrier but it is sufficient to indicate the offset, which in this case is relative to the central frequency of the LTE carrier.

The following proposal is also made:

Proposal 4 For NB-IoT DL non-anchor carrier configuration, the information outlined in preceding ASN.1 is provided to the UE in physicalConfigDedicated-NB.

For carrier reconfiguration to an UL non-anchor carrier, the UE needs to know the UL carrier information. This information can either be explicitly configured via CarrierFreq-NB-r13 mentioned above or alternately in case DL PRB non-anchor is also configured, the same duplex distance as for anchor DL-UL can be indicated to the UE. Furthermore the UE needs to know whether the target UL PRB serves as an anchor carrier for other UEs, i.e. whether the non-anchor is used for random access by others. For simplicity, the same random access configuration shall in such case apply to the target PRB as in source PRB. These configurations are outlined in the ASN.1 format below:

```
-- ASN1START
UL-NonAnchorCarrierFreq-NB-r13 ::= SEQUENCE {
    ulFreqInfo                      CHOICE {
       carrierFreq-NB-r13           CarrierFreq-NB-
r13,
```

-continued

```
    sameDuplexDistanceAsAnchor      NULL -- Cond
    },
    servesAsAnchorForOthers         BOOLEAN
    OPTIONAL, -- Need ON
...}
-- ASN1STOP
```

The following proposals are also made:

Proposal 5 For NB-IoT UL non-anchor carrier configuration, the information outlined in preceding ASN.1 is provided to the UE.

Proposal 6 In case the parameter "servesAsAnAnchorForOthers" is set to "true" in the configuration to non-anchor carrier above for UL and/or DL, the UE shall assume the same available subframes as in its anchor carrier.

As mentioned above, another way to convey many of the parameters above related to non-anchor carrier is through system information on the anchor carrier. This could be beneficial in case an operator often configures UEs to non-anchor carriers with same configuration rather than repeatedly sending the same configuration parameters to different UEs. Hence, it is suggested to define a new SIB that is optionally broadcasted and contains non-anchor configuration parameters. However, in case configuration parameters are provided in physicalConfigDedicated-NB, they override the parameters broadcasted in anchor carrier.

The following proposals are also made:

Proposal 7 In the anchor carrier, it is possible to optionally broadcast NB-IoT DL/UL non-anchor carrier configuration.

Proposal 8 Parameters provided to the UE in physicalConfigDedicated-NB override the non-anchor configuration parameters broadcasted in anchor carrier.

With the above proposals the ASN.1 structure for the new SIB with some of the required IEs is given below.

In particular, the proposed structure for the system information block containing the information about the LTE carrier in the case the non-anchor carrier is in-band.

```
-- ASN1START
SystemInformationBlockTypeX-r13 ::=      SEQUENCE {
  InbandNonAnchorCarrierInfo       ::=   SEQUENCE {
    offsetToLteMiddlePrb-NB-r13          INTEGER (-50 . . 49)
      OPTIONAL, -- Cond samePCI
    startSymbol-NB-r13                   INTEGER (1 . . 4)
      OPTIONAL,
    sameLtePCI-Indicator-NB-r13          BOOLEAN
      OPTIONAL,
    lteCrsPortsCount-NB-r13              ENUMERATED {an1, an2,
an4, spare1} OPTIONAL,
    . . .
  }
}
-- ASN1STOP
```

The InbandNonAnchorCarrierInfo field descriptions are:
offsetToLteMiddlePrb-NB-r13

This parameter gives the PRB index relative to the middle PRB in order for the UE to determine the legacy CRS. The sign of the PRB index is positive for PRBs higher in frequency than the central PRB and negative for PRBs lower in frequency. For an LTE carrier with an even (odd) number of PRBs, the central six (seven) PRBs are not valid as NB-IoT non-anchor carriers.

The PRB index relative to middle PRB is converted to LTE PRB index.

startSymbol-NB-r13

This parameter specifies the PDCCH region of the LTE carrier.

sameLtePCI-Indicator-NB-r13

This parameter specifies whether the non-anchor carrier reuses the same PCI as the LTE carrier.

lteCrsPortsCount-NB-r13

This parameter specifies the number of antenna ports used by the legacy carrier in the in-band case.

samePCI The field is mandatory present if the sameLtePCI-Indicator-NB-r13 is present and set to TRUE. Otherwise the field is not present.

Below follows a summary of the ASN.1 structure. Based on the following structure currently suggested in R2-162070, 36.331 Running CR to capture agreements on NB-IoT, version 13.0.0.

The following are physicalConfigDedicated-NB field descriptions:
Carrier-ConfigDedicated-NB-r13

This parameter contains the non-anchor carrier frequency positions dl-nonAnchorCarrierFreq-NB-r13 and/or ul-nonAnchorCarrierFreq-NB-r13.

The following structure has been proposed for Carrier-ConfigDedicated-NB-r13:

```
-- ASN1START
Carrier-ConfigDedicated-NB-r13 ::=          SEQUENCE {
  dl-nonAnchorCarrierFreq-NB-r13            DL-
NonAnchorCarrierFreq-NB-r13      OPTIONAL,
  ul-nonAnchorCarrierFreq-NB-r13            UL-
NonAnchorCarrierFreq-NB-r13      OPTIONAL,
}
-- ASN1STOP
```

The following are Carrier-ConfigDedicated-NB-r13 field descriptions:
dl-nonAnchorCarrierFreq-NB-r13

This parameter specifies the frequency for the downlink carrier plus some additional information. If this parameter as absent the UE shall continue to use the anchor downlink carrier.

ul-nonAnchorCarrierFreq-NB-r13

This parameter specifies the frequency for the uplink carrier plus some additional information. If this parameter as absent the UE shall continue to use the anchor uplink carrier.

```
-- ASN1START
PhysicalConfigDedicated-NB ::=              SEQUENCE {
  Carrier-ConfigDedicated-NB-r13            Carrier-
ConfigDedicated-NB-r13     OPTIONAL, -- Need ON
  pdsch-ConfigDedicated-NB-r13              PDSCH-ConfigDedicated-
NB-r13                      OPTIONAL, -- Need ON
  pusch-ConfigDedicated-NB-r13              PUSCH-ConfigDedicated-
NB-r13                      OPTIONAL, -- Need ON
  uplinkPowerControlDedicated-NB-r13
  UplinkPowerControlDedicated-NB-r13 OPTIONAL, -- Need ON
  tpc-PDCCH-ConfigPUSCH                     TPC-PDCCH-Config
                                   OPTIONAL, -- Need ON
  cqi-ReportConfig-NB-r13                   CQI-ReportConfig-
NB-r13                      OPTIONAL, -- Need ON
  soundingRS-UL-ConfigDedicated-NB-r13      SoundingRS-UL-
ConfigDedicated-NB-r13     OPTIONAL, -- Need ON
  . . .
}
-- ASN1STOP
```

```
-- ASN1START
DL-NonAnchorCarrierFreq-NB-r13 ::= SEQUENCE {
    carrierFreq-NB-r13              CarrierFreq-NB-r13,
    nbRsPortsCount-NB-r13           ENUMERATED {n1, n2}
        OPTIONAL, -- Need ON
    servesAsAnchorForOthers         BOOLEAN
        OPTIONAL, -- Need ON
    inbandNonAnchorCarrierInfo
    InbandNonAnchorCarrierInfo OPTIONAL, -- Cond SIconfig
...}
-- ASN1STOP
```

The following are DL-NonAnchorCarrierFreq-NB-r13 field descriptions:

nbRsPortsCount-NB-r13

This parameter specifies whether the eNB uses one antenna port (n1) or two (n2). If this parameter is not present, the UE shall assume the same number of antenna ports as configured for the anchor carrier.

servesAsAnchorForOthers

If this parameter is set to True the non-anchor carrier contains NPSS/NSSS, NPBCH and System Information.

inbandNonAnchorCarrierInfo

This parameter gives the configuration for the downlink non-anchor carrier. This configuration will override any previous configured by system information broadcast in the anchor carrier.

The SIconfig field is mandatory present if the UE is reconfigured to an in-band carrier and InbandNonAnchorCarrierInfo is not provided in SI. Otherwise the field is optional present, and any configuration given will override the corresponding one in SI.

```
-- ASN1START
InbandNonAnchorCarrierInfo ::=      SEQUENCE {
    offsetToLteMiddlePrb-NB-r13         INTEGER (-50 .. 49)
        OPTIONAL, -- Cond samePCI
    startSymbol-NB-r13                  INTEGER (1 .. 4)
        OPTIONAL,
    sameLtePCI-Indicator-NB-r13         BOOLEAN
        OPTIONAL,
    lteCrsPortsCount-NB-r13             ENUMERATED {an1, an2,
    an4, spare1} OPTIONAL,
}
-- ASN1STOP
```

The following are InbandNonAnchorCarrierInfo field descriptions offsetToLteMiddlePrb-NB-r13

This parameter gives the PRB index relative to the middle PRB in order for the UE to determine the legacy CRS. The sign of the PRB index is positive for PRBs higher in frequency than the central PRB and negative for PRBs lower in frequency. For an LTE carrier with an even number of PRBs the central six PRBs ({−3, 2}) are not valid as NB-IoT non-anchor carriers, and for odd numbers of PRBs the central seven PRBs ({−3, 3}) are not valid. The PRB index relative to middle PRB is converted to LTE PRB index.

startSymbol-NB-r13

This parameter specifies the PDCCH region of the LTE carrier. sameLtePCI-Indicator-NB-r13

This parameter specifies whether the non-anchor carrier reuses the same PCI as the LTE carrier.

lteCrsPortsCount-NB-r13

This parameter specifies the number of antenna ports used by the legacy carrier in the in-band case.

The samePCI field is mandatory present if the sameLtePCI-Indicator-NB-r13 is present and set to TRUE. Otherwise the field is not present.

```
-- ASN1START
UL-NonAnchorCarrierFreq-NB-r13 ::= SEQUENCE {
    ulFreqInfo                      CHOICE {
        carrierFreq-NB-r13              CarrierFreq-NB-
    r13,
        sameDuplexDistanceAsAnchor      NULL -- Cond
    },
    servesAsAnchorForOthers         BOOLEAN
        OPTIONAL, -- Need ON
...}
-- ASN1STOP
```

The following are UL-NonAnchorCarrierFreq-NB-r13 field descriptions ulFreqInfo

This parameter specifies whether the frequency for the uplink carrier explicitly included or implicit from reusing the same duplex distance as for the anchor carrier.

sameDuplexDistanceAsAnchor

If the downlink non-anchor carrier is specified by DL-NonAnchorCarrierFreq-NB-r13, this parameter can be specified to reuse the same duplex distance as for the anchor carrier and hence the uplink carrier frequency is not specified.

servesAsAnchorForOthers

If this parameter is set to True the non-anchor carrier contains NPSS/NSSS, NPBCH and System Information.

```
-- ASN1START
CarrierFreq-NB-r13 ::=      SEQUENCE {
    carrierFreq-NB-r13          ARFCN-ValueEUTRA-r9,
    carrierFreqOffset-NB-r13 INTEGER (0 .. 19)
    OPTIONAL,    -- Need ON }
-- ASN1STOP
```

The following are CarrierFreq-NB-r13 field descriptions carrierFreq-NB-r13

This parameter specifies the central frequency for the carrier in terms on ARFCN.

carrierFreqOffset-NB-r13

The frequency offset of the carrier relative to the central frequency is given as ((carrierFreqOffset-NB-r13−10)*2+1)*2.5) kHz for downlink, and ((carrierFreqOffset-NB-r13−10)*2)*2.5) kHz for uplink. If this optional parameter is omitted the UE shall apply a zero offset according to 'Need ON'.

[Modifications and Variations]

The present description has been given with DL configuration as an example. However, UL configuration is envisaged by the present inventors using a similar apparatus. In this case the wireless radio device 403 would need to avoid UL transmission colliding with PRACH resources that might be used by wireless radio devices having the second carrier 402 as their carrier. Parts of the UL subframe may operate on single-tones or multi-tones. These "tones" refer to sub-carriers in the UL (either 3.75 kHz or 15 kHz). Therefore, not all of the 180 kHz UL is necessarily used by one wireless radio device in UL.

In this regard, the network entity 400 is arranged to indicate for each of UL and DL respectively that the second carrier 402 is configured to serve as a carrier for other wireless radio devices (e.g. the second group of wireless radio devices). An indicator is provided for each of UL and DL respectively, as the wireless radio device 403 might only be configured to operate only in UL or DL on a NB-IoT non-anchor carrier.

The foregoing description of embodiments of the invention has been presented for the purpose of illustration and description. It is not intended to be exhaustive or to limit the invention to the precise form disclosed. Modifications and variations can be made without departing from the spirit and scope of the present invention.

[Abbreviations]
CRS Cell Reference Symbols
FDD Frequency Division Duplex
LTE Long Term Evolution
MBSFN Multimedia Broadcast Single Frequency network
MIB Master Information Block
NB Narrowband
NB-IoT NB Internet of Things
NDLSCH NB Downlink Shared Channel
NPBCH NB Physical Broadcast Channel
NPRACH NB Physical Random Access Channel
NPSS NB Primary Synchronization Signal
NRS NB Reference Symbols
NSSS NB Secondary Synchronization Signal
NW Network
SI System Information
SIB System Information Block
UE User Equipment

The invention claimed is:

1. A network entity, comprising:
processing circuitry configured to cause the network entity to control:
a first carrier arranged to serve at least a first group of wireless radio devices; and
a second carrier arranged to serve at least a second group of wireless radio devices;
wherein the first carrier is further arranged, when a wireless radio device belonging to a first group of wireless radio devices connects to the first carrier, to transfer the wireless radio device to the second carrier; and
wherein the network entity is configured to, when the wireless radio device is transferred, indicate to the wireless radio device that the second carrier is configured to serve as a carrier for other wireless radio devices,
wherein the processing circuitry is configured to cause the network entity to indicate, to the wireless radio device, that rate-matching is allowed around non-available subframes and to cause the wireless radio device to turn off its receiver/transmitter chain during non-available subframes;
wherein the first carrier and the second carrier belong to a narrowband internet of things (NB-IoT) based on a same long term evolution (LTE) network and have different subframe configurations; and
wherein the processing circuitry is configured to cause the network entity to convey information indicative of the subframe configuration of the second carrier to the wireless radio device.

2. The network entity of claim 1, wherein the processing circuitry is configured to cause the network entity to provide, to the wireless radio device, synchronization signals and system information.

3. The network entity of claim 1:
wherein the first carrier is arranged to provide synchronization signals and system information to at least the first group of wireless radio devices; and
wherein the second carrier is arranged to provide synchronization signals and system information to at least the second group of wireless radio devices.

4. The network entity of claim 1:
wherein the first carrier is arranged to operate in: a LTE in-band mode, a LTE guard-band mode, or an NB-IoT stand alone mode; and
wherein the second carrier is arranged to operate in: the LTE in-band mode, the LTE guard-band mode, or the NB-IoT stand alone mode.

5. A wireless radio device belonging to a first group of wireless radio devices, the wireless radio device comprising:
processing circuitry configured to cause the wireless radio device to:
connect to a first carrier arranged to serve at least the first group of wireless radio devices and arranged to transfer the connected wireless radio device to a second carrier arranged to serve at least a second group of wireless radio devices; and
receive an indication that the second carrier is configured to serve as a carrier for other wireless radio devices,
wherein the processing circuitry is configured to cause the wireless radio device to perform rate-matching around non-available subframes and to turn off its receiver/transmitter chain during non-available subframes;
wherein the first carrier and the second carrier belong to a narrowband internet of things (NB-IoT) based on a same long term evolution (LTE) network and have different subframe configurations; and
wherein the processing circuitry is configured to cause the wireless device to receive information indicative of the subframe configuration of the second carrier.

6. The wireless radio device of claim 5, wherein the processing circuitry is configured to cause the wireless radio device to receive synchronization signals and system information.

7. The wireless radio device of claim 5, wherein the processing circuitry is configured to cause the wireless radio device to:
utilize a target carrier NB-IoT primary synchronization channel (NPSS) and/or NB-IoT secondary synchronization channel (NSSS).

8. A method of controlling a network entity, the method comprising:
transferring a connected wireless radio device belonging to a first group of wireless radio devices from a first carrier arranged to serve at least a first group of wireless radio devices to a second carrier arranged to serve at least a second group of wireless radio devices;
indicating to the transferred wireless radio device that the second carrier is configured to serve as a carrier for other wireless radio devices;
indicating, to the wireless radio device, that rate-matching is allowed around non-available subframes; and
causing the wireless radio device to turn off its receiver/transmitter chain during the non-available subframes; and
conveying information indicative of the subframe configuration of the second carrier to the wireless radio device;
wherein the first carrier and the second carrier belong to a narrowband internet of things (NB-IoT) based on a same long term evolution (LTE) network and have different subframe configurations.

9. The method of claim 8, further comprising providing, to the wireless radio device, synchronization signals and system information.

10. The method of claim 8:
wherein the first carrier is arranged to provide synchronization signals and system information to at least the first group of wireless radio devices; and
wherein the second carrier is arranged to provide synchronization signals and system information to at least the second group of wireless radio devices.

11. The method of claim 8:
wherein the first carrier is arranged to operate in: a LTE in-band mode, a LTE guard-band mode, or an NB-IoT stand alone mode; and
wherein the second carrier is arranged to operate in: the LTE in-band mode, the LTE guard-band mode, or the NB-IoT stand alone mode.

12. A method of controlling a wireless radio device belonging to a first group of wireless radio devices, the method comprising:
connecting to a first carrier arranged to serve at least the first group of wireless radio devices and arranged to transfer the connected wireless radio device to a second carrier arranged to serve at least a second group of wireless radio devices;
receiving an indication that a second carrier is configured to serve as a carrier for other wireless radio devices;
performing rate-matching around non-available subframes;
turning off receiver/transmitter chain during non-available subframes; and
receiving information indicative of the subframe configuration of the second carrier;
wherein the first carrier and the second carrier belong to a narrowband internet of things (NB-IoT) based on a same long term evolution (LTE) network and have different subframe configurations.

13. The method of claim 12, further comprising receiving synchronization signals and system information.

14. The method of claim 12, further comprising the wireless radio device:
utilizing a target carrier NB-IoT primary synchronization channel (NPSS) and/or NB-IoT secondary synchronization channel (NSSS).

\* \* \* \* \*